(12) United States Patent
Kim

(10) Patent No.: US 7,520,565 B2
(45) Date of Patent: Apr. 21, 2009

(54) STRUCTURE FOR IMPROVING PERFORMANCE OF AN ACTIVE HEADREST

(75) Inventor: Sang Ho Kim, Incheon (KR)

(73) Assignee: KIA Motors Corporation (KR)

( * ) Notice: Subject to any disclaimer, the term of this patent is extended or adjusted under 35 U.S.C. 154(b) by 51 days.

(21) Appl. No.: 11/647,439

(22) Filed: Dec. 27, 2006

(65) Prior Publication Data

US 2008/0036250 A1 Feb. 14, 2008

(30) Foreign Application Priority Data

Aug. 10, 2006 (KR) .................. 10-2006-0075711

(51) Int. Cl.
*B60N 2/427* (2006.01)
*B60R 21/00* (2006.01)

(52) U.S. Cl. ................................. 297/216.12

(58) Field of Classification Search ........... 297/216.12, 297/216.13

See application file for complete search history.

(56) References Cited

U.S. PATENT DOCUMENTS

| 6,199,947 | B1 * | 3/2001 | Wiklund ............... | 297/216.12 |
| 6,572,186 | B1 * | 6/2003 | Fischer et al. ......... | 297/216.12 |
| 6,692,071 | B2 * | 2/2004 | Fowler .................. | 297/216.12 |
| 6,749,256 | B1 * | 6/2004 | Klier et al. ............. | 297/216.12 |
| 6,779,840 | B1 * | 8/2004 | Farquhar et al. ....... | 297/216.12 |
| 6,866,339 | B2 * | 3/2005 | Itoh ...................... | 297/216.13 |
| 7,017,989 | B2 * | 3/2006 | Yamaguchi et al. .... | 297/216.12 |
| 7,044,544 | B2 * | 5/2006 | Humer et al. .......... | 297/216.12 |
| 7,188,894 | B2 * | 3/2007 | Humer et al. .......... | 297/216.13 |
| 2006/0202525 | A1 * | 9/2006 | Yamaguchi et al. .... | 297/216.12 |

FOREIGN PATENT DOCUMENTS

| JP | 2000-211411 | 8/2000 |
| JP | 2004-106647 | 4/2004 |
| JP | 2004-330941 | 11/2004 |
| JP | 2004-358207 | 12/2004 |

\* cited by examiner

*Primary Examiner*—Rodney B. White
*Assistant Examiner*—Sarah B. McPartlin
(74) *Attorney, Agent, or Firm*—Morgan, Lewis & Bockius LLP

(57) ABSTRACT

A structure for improving performance of an active headrest comprises a lumbar support plate which is installed within a seat back frame and supports the body of an occupant; a lumbar support interlocking wire which operates by being interlocked with the lumbar support plate and a link bracket which is disposed on the lumbar support interlocking wire and is rotated by the lumbar support interlocking wire so as to rotate a link connecting pipe which raises an active headrest pipe; a stopper which is disposed behind the active headrest pipe and is installed to an inner side of the seat back frame; and a hooking projection which supports a lower end portion of the active headrest pipe such that the active headrest pipe cannot go down during a vehicle impact.

5 Claims, 6 Drawing Sheets

STRUCTURE FOR IMPROVING PERFORMANCE OF AN ACTIVE HEADREST

CROSS-REFERENCE TO RELATED APPLICATION

This application claims priority to Korean Patent Application No. 10-2006-0075711 filed in the Korean Intellectual Property Office on Aug. 10, 2006, the disclosure of which is incorporated herein by reference.

BACKGROUND OF THE INVENTION (a) Field of the Invention

The present invention relates to a structure for improving performance of an active headrest.

(b) Description of the Related Art

An active headrest is a general term for a headrest which automatically rises when a vehicle is impacted. The active headrest supports the head of an occupant, thereby protecting the head and the neck of an occupant.

The active headrest operates by being interlocked with a seat thereby preventing an occupant from suffering major injuries. The active headrest moves upward and forward so as to support the head and the neck of an occupant.

However, there have been issues with the operating time of the active headrest not acting in time support the head and the neck of an occupant when a vehicle is impacted. Furthermore, there have also been issues with active headrest not functioning properly after a vehicle has been impacted.

Quite surprisingly, the present invention solves these problems.

SUMMARY OF THE INVENTION

The present invention provides an active headrest which reduces the operating time thereof so as to quickly support the head and the neck of an occupant.

The present invention provides an active headrest which continuously supports the head and the neck of an occupant by maintaining the active headrest to the operated position after the operation thereof.

In one embodiment, a structure for improving performance of an active headrest comprises a lumbar support plate which is installed within a seat back frame and supports the body of an occupant; a lumbar support interlocking wire which operates by being interlocked with the lumbar support plate and a link bracket which is disposed on the lumbar support interlocking wire and is rotated by the lumbar support interlocking wire so as to rotate a link connecting pipe which raises an active headrest pipe; a stopper which is disposed behind the active headrest pipe and is installed to an inner side of the seat back frame; and a hooking projection which supports a lower end portion of the active headrest pipe such that the active headrest pipe cannot go down at an operated position of the active headrest being formed in the stopper.

The structure may further comprise a pelvis guide which is installed inside the seat back frame so as to support a lower end portion of the lumbar support interlocking wire; a guide slot being formed in the pelvis guide, and guides the lumbar support interlocking wire such that the lumbar support interlocking wire is positioned at a lower portion of an inner circumference thereof at a non-operated position of the active headrest; and the lumbar support interlocking wire which is positioned at an upper portion of an inner circumference thereof at an operated position of the active headrest.

In an exemplary embodiment, the guide slot may be bent toward an upper portion of the seat back frame corresponding to a moving locus of a lower bent part of the lumbar support interlocking wire while the lumbar support interlocking wire is compressed by the lumbar support plate.

In another exemplary embodiment, the stopper may further include a slit which is formed around the hooking projection such that the hooking projection can be retreated when the hooking projection is compressed by the active headrest pipe.

In an exemplary embodiment, the stopper may further include a hook which is formed along an edge of the stopper and is inserted into the seat back frame.

DETAILED DESCRIPTION OF THE INVENTION

An exemplary embodiment of the present invention will hereinafter be described in detail with reference to the accompanying drawings.

Figure 1:
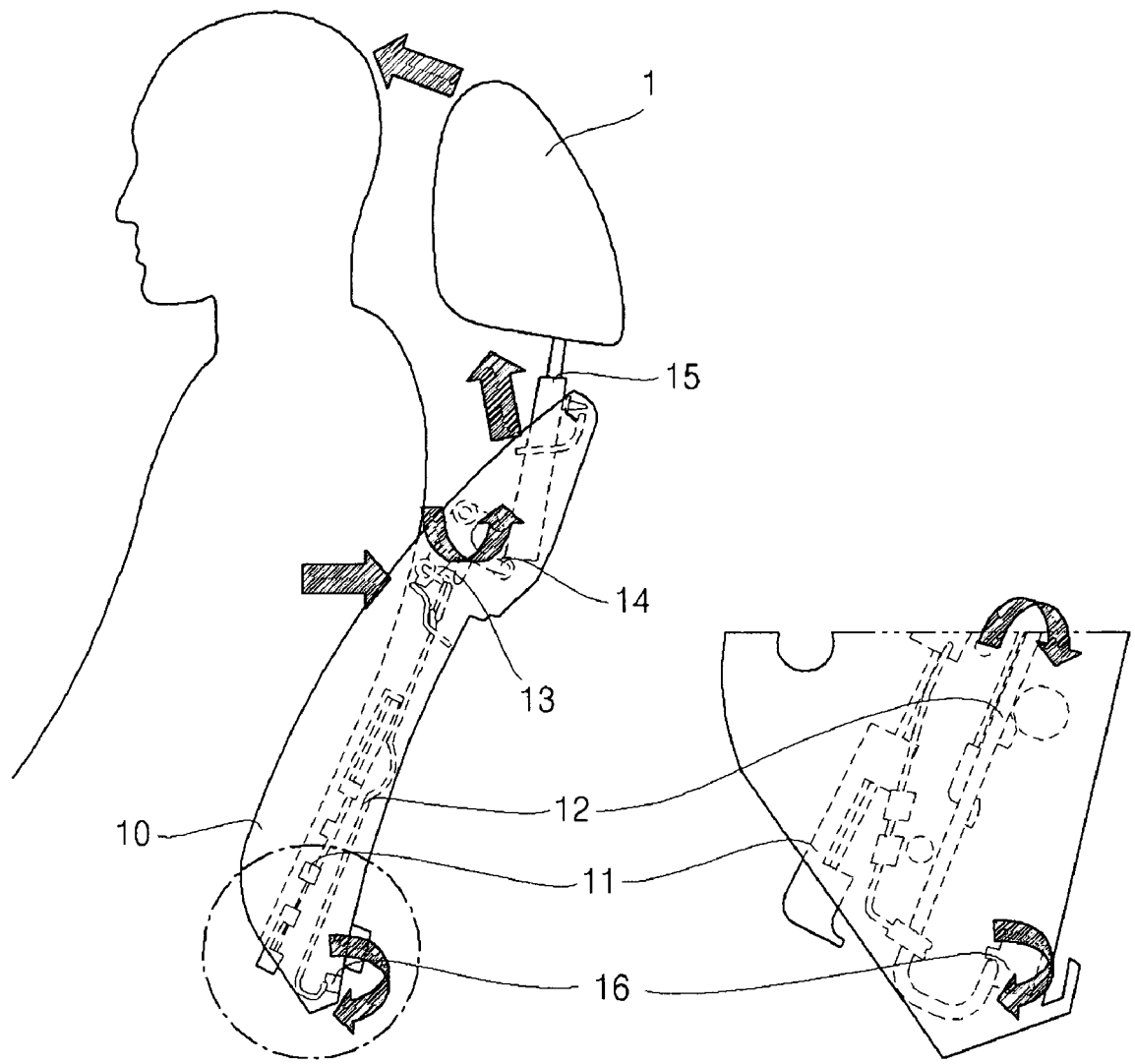
FIG. 1 is a side view showing an operating structure of a conventional active headrest.
Figure 2:
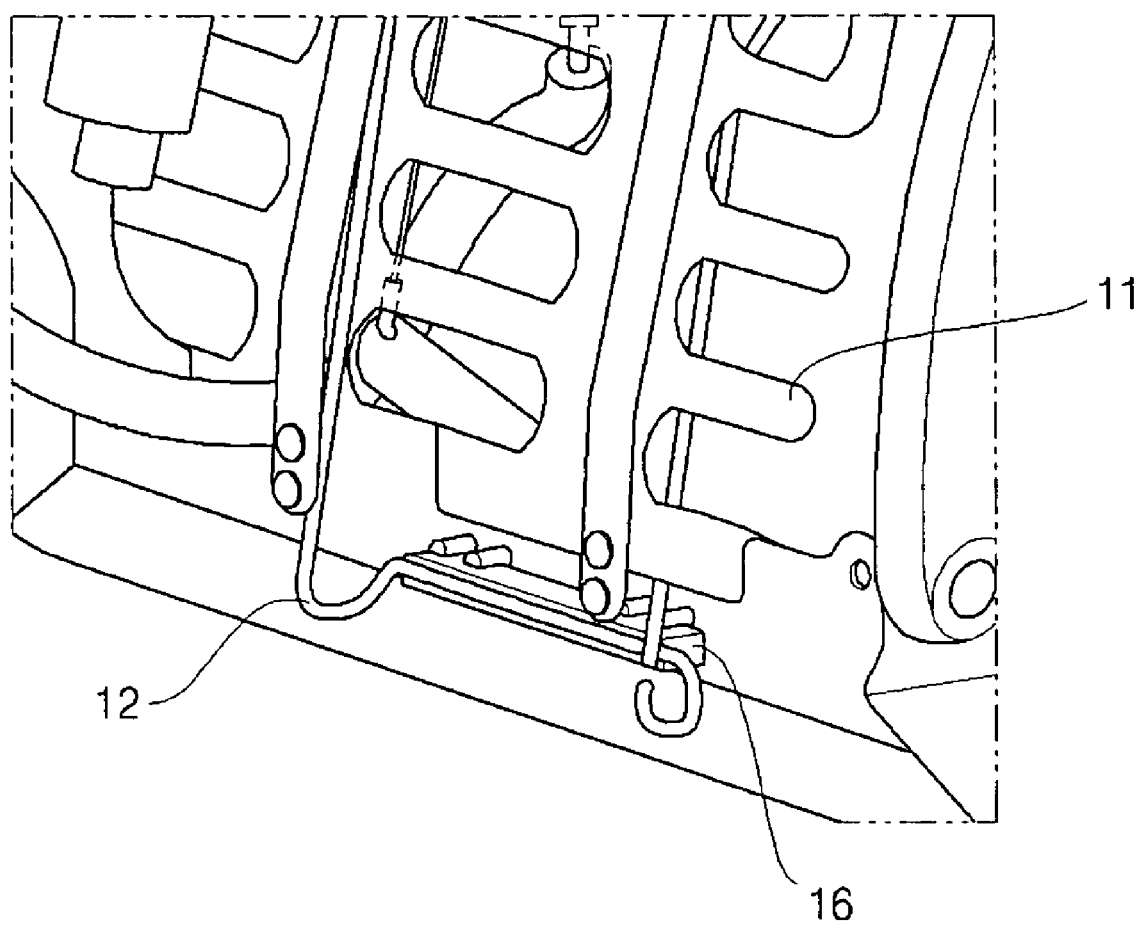
FIG. 2 is a perspective view partially showing a lower fixing structure of a lumbar support interlocking wire of FIG. 1.

As shown in FIG. 1 and FIG. 2, a conventional active headrest 1 is driven by a lumbar support plate 11 which is disposed inside a seat back frame 10 and supports the body of an occupant. One end of a lumbar support interlocking wire 12 is interlocked with the lumbar support plate 11 and the second end, which is coupled to a link connecting pipe 14 and a link bracket 13, is rotated by the lumbar support interlocking wire 12 so as to rotate the link connecting pipe 14 and raise an active headrest pipe 15.

When a vehicle is impacted, the body of an occupant compresses the lumbar support plate 11, the lumbar support plate 11 pushes the lumbar support interlocking wire 12, thereby rotating the link bracket 13.

While the link bracket 13 rotates, the link bracket 13 raises the link connecting pipe 14, thereby allowing the active headrest pipe 15 to rise and operate the active headrest 1.

However, as shown in FIG. 2, in the conventional active headrest, since a lower end of the lumbar support interlocking wire 12 is fixed by a fixing member 16, the lumbar support interlocking wire 12 cannot sufficiently rotate the link bracket 13. Therefore, the active headrest pipe 15 may not rise sufficiently, thus causing the active headrest 1 to operate much later after a vehicle has impacted.

Furthermore, since there is no separate member for fixing the active headrest 1 at an operated position, the active headrest 1 returns to its original position, so that the head and the neck are not continuously supported. This may cause injuries to the head and neck of an occupant.

Figure 3:
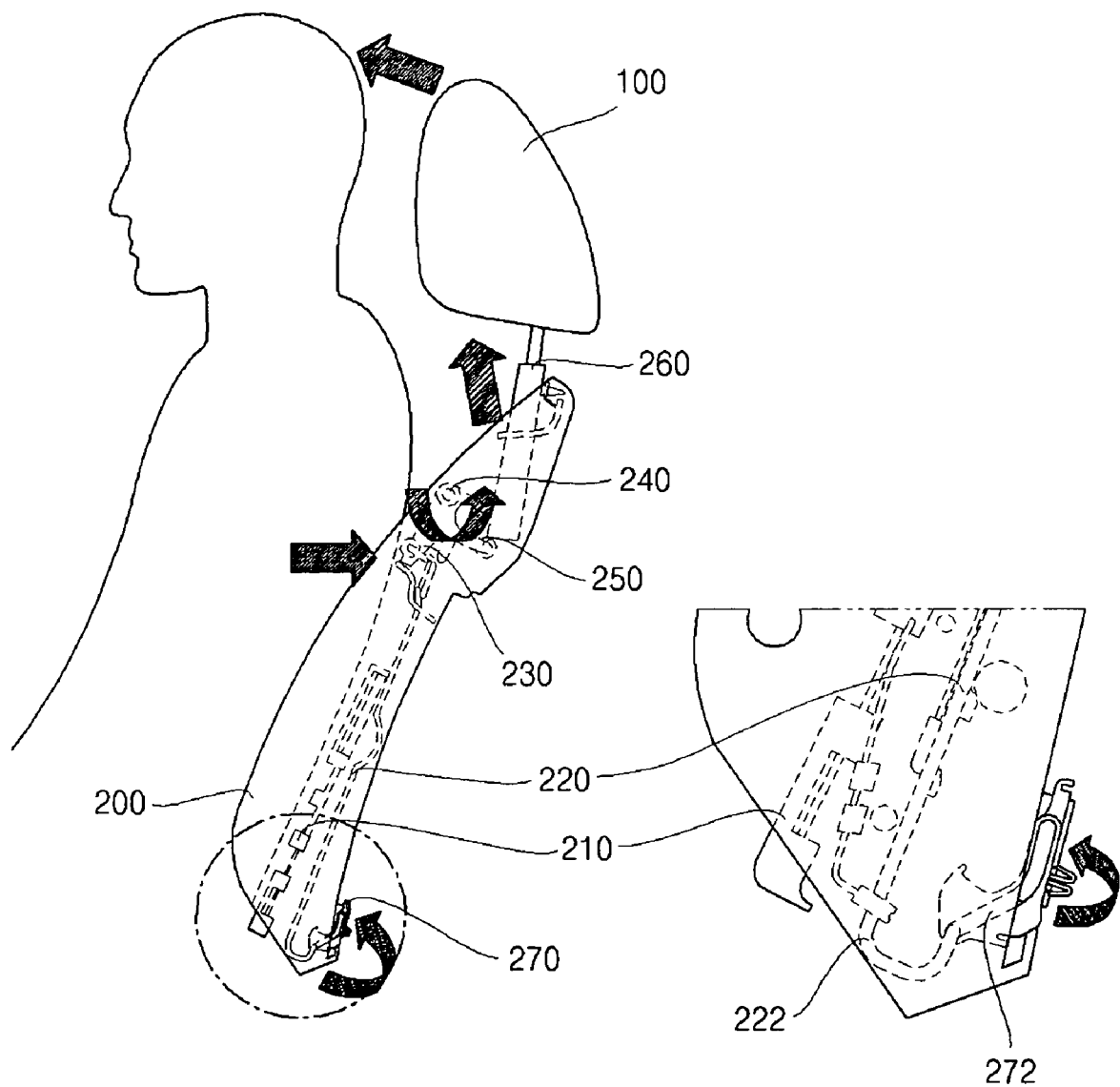
FIG. 3 is a side view showing an operating structure of an active headrest according to an exemplary embodiment of the present invention.

As shown in FIG. 3, an active headrest 100 according to an exemplary embodiment of the present invention is driven by a lumbar support plate 210 which is installed within a seat back frame 200 and supports the body of an occupant. When a vehicle is impacted, the lumbar support interlocking wire 220, which is compressed by the lumbar support plate 210, rotates a link bracket 230 with respect to a hinge point 240. A link connecting pipe 250, which goes up while being rotated by the link bracket 230, raises an active headrest pipe 260.

Figure 4:
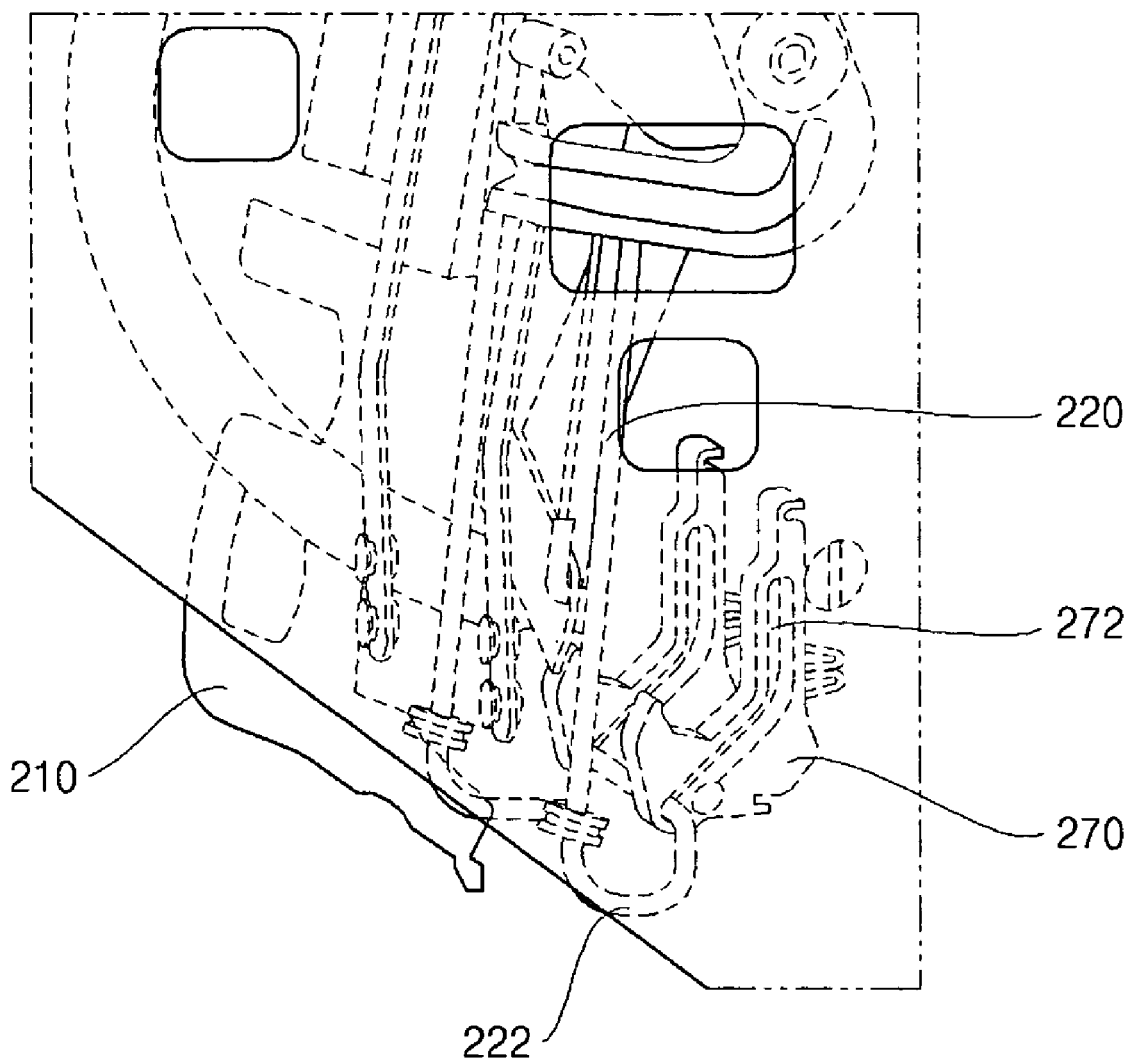
FIG. 4 is a perspective view partially showing a lower fixing structure of a lumbar support interlocking wire of FIG. 3.

A pelvis guide 270 is provided behind a lower bent part 222 of the lumbar support interlocking wire 220 so as to support a lower part of the lumbar support interlocking wire 220 (referring to FIG. 3 and FIG. 4). A stopper 280 is provided at a rear end portion of the active headrest pipe 260 (referring to FIG. 5 and FIG. 6). A stopper 280 fixes an operation position of the active headrest pipe 260.

As shown in FIG. 4, the pelvis guide 270 receives the lower bent part 222 of the lumbar support interlocking wire 220.

A guide slot 272, which is bent toward an upper portion of the seat back frame 200, is formed in the pelvis guide 270, and the lumbar support interlocking wire 220 is housed and supported by the guide slot 272.

As shown in FIG. 3 and FIG. 4, if the body of an occupant is thrust toward the rear of a seat by a vehicle being impacted, the lumbar support plate 210 is pushed toward the rear of the seat back frame 200 so as to compress the lumbar support interlocking wire 220.

Accordingly, while the lumbar support interlocking wire 220 retreats toward the rear of the seat back frame 200, the lower bent part 222 moves along the guide slot 272, thereby inserting into the guide slot 272 which is formed in the pelvis guide 270.

The lumbar support interlocking wire 220 is housed in the guide slot 272 and contacts the lower portion of the inner circumference of the guide slot 272 when a vehicle is not impacted. The lumbar support interlocking wire 220 is pushed to move up to an upper portion of an inner circumference of the guide slot 272 when a vehicle is impacted.

While the lower bent part 222 of the lumbar support interlocking wire 220 goes up along the guide slot 272, an upper end of the lumbar support interlocking wire 220 also goes up toward the active headrest 100.

While the lumbar support interlocking wire 220 rises, the lumbar support interlocking wire 220 rotates the link bracket 230 toward the rear of the seat back frame 200 with respect to the hinge point 240. While the link connecting pipe 250 rises by the rotation of the link bracket 230, the link connecting pipe 250 raises the active headrest pipe 260.

Since the number of motions of the lumbar support interlocking wire 220 of the present invention is much more than that of a conventional lumbar support interlocking wire, the number of motions of the active headrest pipe 260 is also greater in the present invention.

Accordingly, the operating speed of the active headrest 100 is quicker, thereby allowing the active headrest 100 to act quicker in supporting the head and the neck of an occupant during a vehicle impact.

At this time, the stopper 280 supports the active headrest pipe 260 such that the active headrest 100 does not return to its original position.

Figure 5:
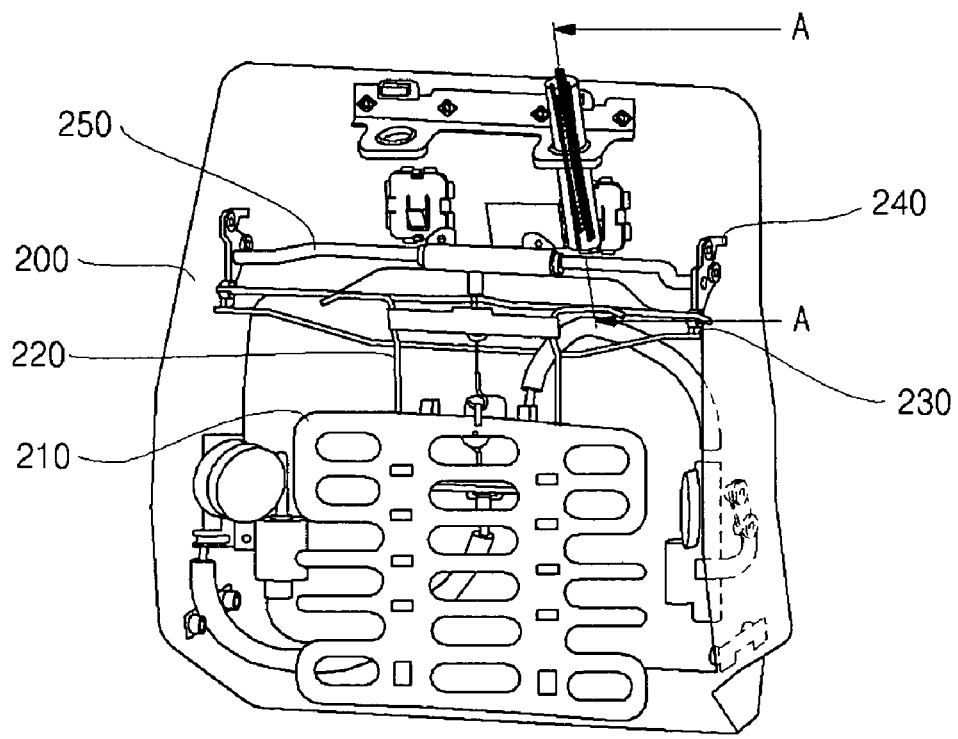
FIG. 5 is a perspective showing a detailed structure of an active headrest of FIG. 3.
Figure 6:
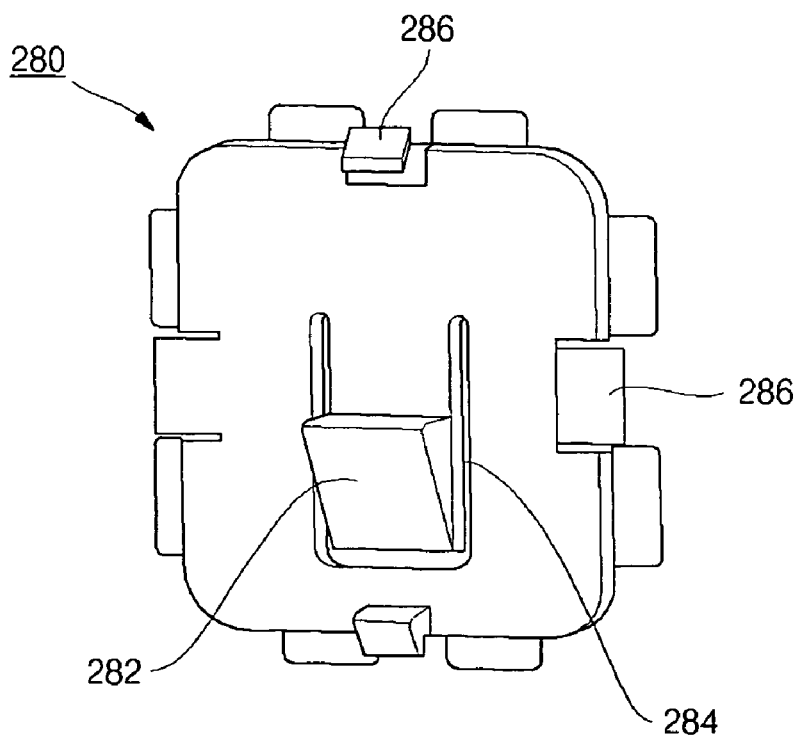
FIG. 6 is a perspective view of a stopper of FIG. 5.

As shown in FIG. 5 and FIG. 6, the stopper 280 is installed to an inner side of the seat back frame 200 so as to be located at an end portion of the active headrest pipe 260 at an operated position of the active headrest 100.

The stopper 280 includes a hooking projection 282 to which an end portion of the active headrest pipe 260 is hooked; a slit 284 which is formed around the circumference of the hooking projection 282; and a hook 286 which is connected to the seat back frame 200.

While the outer circumference of the active headrest pipe 260 rises along the hooking projection 282, an outer circumference of the active headrest pipe 260 compresses the hooking projection 282. In order to reduce friction generated during this time, the slit 284 is formed.

The hooking projection 282 has elasticity by the slit 284 at which the hooking projection 282 can retreat toward the rear of the seat back frame 200. It is preferable that the stopper 280 is made of material which includes, but is not limited to, reinforced plastic and a metal plate so that it is not broken by the repetition of retreating and returning of the hooking projection 282.

A plurality of the hooks 286 may be formed along an edge of the stopper 280. An insertion hole (not shown) into which the hook 286 is inserted may preferably be formed in the seat back frame 200.

Figure 7:
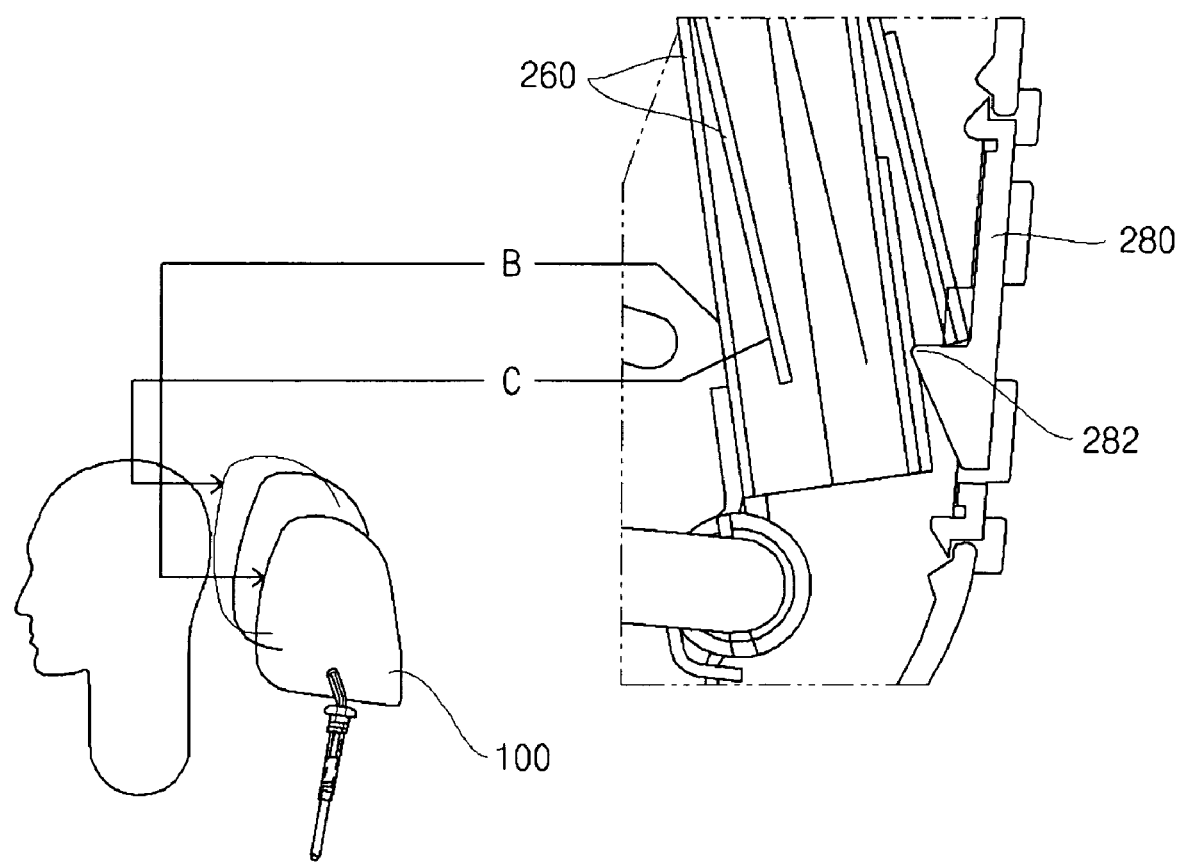
FIG. 7 is a cross sectional view showing an operating state of an active headrest taken along a line A-A in FIG. 5.

As shown in FIG. 7, in the state (B) in which the active headrest 100 is not operated, the active headrest pipe 260 just contacts the stopper 280, but is not hooked.

However, in the state (C) in which the active headrest 100 is operated, the active headrest pipe 260 slides on an outer surface of the hooking projection 282 and reaches the hooking projection 282. Since the active headrest pipe 260 cannot return toward the lower part of the seat back frame 200 by the hooking projection 282, the active headrest 100 also cannot return to its original position.

Accordingly, the active headrest 100 maintains the operated state so as to continuously support the head and the neck of an occupant.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A structure for improving performance of an active headrest comprising:
   a lumbar support plate which is installed within a seat back frame and supports the body of an occupant;
   a lumbar support interlocking wire which operates by being interlocked with the lumbar support plate and a link bracket which is disposed on the lumbar support interlocking wire and is rotated by the lumbar support interlocking wire so as to rotate a link connecting pipe which raises an active headrest pipe which is pivotally supported by the link bracket therebetween; and
   a stopper including a hook projection, the stopper disposed behind the active headrest pipe and affixed to an inner side of the seat back frame; and
   wherein the hooking projection supports a lower end portion of the active headrest pipe such that the active headrest pipe cannot go down at an operated position of the active headrest being formed in the stopper.

2. The structure of claim 1, further comprising:
   a pelvis guide which is installed inside the seat back frame so as to support a lower end portion of the lumbar support interlocking wire;
   a guide slot being formed in the pelvis guide, and guides the lumbar support interlocking wire such that the lumbar support interlocking wire is positioned at a lower portion of an inner circumference when the active headrest is not being operated; and the lumbar support interlocking wire is positioned at an upper portion of an inner circumference thereof when the active headrest is operated.

3. The structure of claim 2, wherein the guide slot is bent toward an upper portion of the seat back frame and the lumbar support interlocking wire is compressed by the lumbar support plate.

4. The structure of claim 1, wherein the stopper further comprises a slit which is formed around the hooking projection wherein the hooking projection can retreat when the hooking projection is compressed by the active headrest pipe.

5. The structure of claim 1, wherein the hook projection is formed along an edge of the stopper and is inserted into the seat back frame.

* * * * *